United States Patent
Moreno Linares et al.

(10) Patent No.: US 12,544,696 B2
(45) Date of Patent: Feb. 10, 2026

(54) WATER SEPARATING SCREEN FOR A FILTER ELEMENT IN A LIQUID FILTER

(71) Applicant: MANN+HUMMEL GmbH, Ludwigsburg (DE)

(72) Inventors: Andrés Moreno Linares, Ludwigsburg (DE); Sebastian Neubauer, Marbach (DE); Helen Neubauer, Ludwigsburg (DE)

(73) Assignee: MANN+HUMMEL GmbH, Ludwigsburg (DE)

(*) Notice: Subject to any disclaimer, the term of this patent is extended or adjusted under 35 U.S.C. 154(b) by 602 days.

(21) Appl. No.: 18/056,335

(22) Filed: Nov. 17, 2022

(65) Prior Publication Data
US 2023/0075592 A1  Mar. 9, 2023

Related U.S. Application Data

(63) Continuation-in-part of application No. 15/016,392, filed on Feb. 5, 2016, now abandoned, which is a continuation of application No. PCT/EP2014/066690, filed on Aug. 4, 2014.

(30) Foreign Application Priority Data

Aug. 5, 2013 (DE) .............. 102013012917

(51) Int. Cl.
*B01D 36/00* (2006.01)
*B01D 17/04* (2006.01)
*B01D 29/21* (2006.01)

(52) U.S. Cl.
CPC ......... *B01D 36/003* (2013.01); *B01D 17/045* (2013.01); *B01D 29/21* (2013.01); *B01D 2201/4084* (2013.01)

(58) Field of Classification Search
CPC ............ B01D 36/003; B01D 17/045; B01D 2201/0415; B01D 29/58
See application file for complete search history.

(56) References Cited

U.S. PATENT DOCUMENTS

| 6,458,303 B1 | 10/2002 | Fuehrer et al. |
| 2003/0010706 A1 | 1/2003 | Baracchi et al. |
| 2004/0163690 A1 | 8/2004 | Kim |

(Continued)

FOREIGN PATENT DOCUMENTS

| DE | 102010054349 A1 | 6/2011 |
| DE | 102010030987 A1 | 1/2012 |

(Continued)

OTHER PUBLICATIONS

Office Action in corresponding German Appln. No. 102013012917.6, Mar. 24, 2015, 8 pages, Germany.

*Primary Examiner* — Benjamin M Kurtz

(57) ABSTRACT

A water separating screen for a filter element in a liquid filter, the water separating screen including: a screen fabric having end faces; and a fabric carrier; a screen fabric arranged on the fabric carrier and encircling a longitudinal axis, the screen fabric having axial end faces, the longitudinal axis defining an axial direction; wherein the fabric carrier in an area between the end faces exclusively has longitudinal struts, which at least substantially extend in the direction of the longitudinal axis and which are elastic in a radial direction.

8 Claims, 4 Drawing Sheets

(56) References Cited

U.S. PATENT DOCUMENTS

| | | |
|---|---|---|
| 2006/0107638 A1 | 5/2006 | Holzmann et al. |
| 2013/0146523 A1* | 6/2013 | Veit .................... B01D 36/003 |
| | | 210/315 |
| 2013/0276633 A1 | 10/2013 | Berisha et al. |
| 2015/0308393 A1* | 10/2015 | Boiger .................. B01D 29/58 |
| | | 210/335 |

FOREIGN PATENT DOCUMENTS

| | | |
|---|---|---|
| EP | 1088720 A2 | 4/2001 |
| EP | 1256707 A2 | 11/2002 |
| WO | 2012097851 A1 | 7/2012 |

* cited by examiner

WATER SEPARATING SCREEN FOR A FILTER ELEMENT IN A LIQUID FILTER

CROSS-REFERENCE TO RELATED APPLICATIONS

This application is a continuation in part application of U.S. application Ser. No. 15/016,392 having a filing date of 5 Feb. 2016, which is a continuation of international application No. PCT/EP2014/066690 having an international filing date of 4 Aug. 2014 and designating the United States, the international application claiming a priority date of 5 Aug. 2013 based on prior filed German patent application No. 102013012917, the entire contents of the aforesaid US application the aforesaid international application and the aforesaid German patent application being incorporated herein by reference tio the fullest extent permitted by the law.

TECHNICAL FIELD

The present invention relates to a water separating screen for a filter element in a liquid filter.

BACKGROUND OF THE INVENTION

A filter system for diesel fuel including an annular particle filter in a filter housing, which has an also annular coalescing element connected upstream, is known from the publication WO 2004/082804 A1. In order to facilitate the water separation, dispersively present droplets of water in the fuel are accumulated to larger droplets via the coalescing element. The coalescing element and the filter element are mounted about a center pipe centrally situated in the receiving space of the filter housing, which serves to discharge the cleaned fuel.

The publication DE 20 2011 002 684 U1 describes a filter for insertion into a fuel tank, which has a filter sock made out of a fabric braced by web-like stiffening elements, which are flexibly deformable. In this way, it is to be achieved that, when inserting the filter into a curvedly formed filler neck, the filter may follow the run without damage. The sock-like filter, however, only serves for filtering particles; a water separation can not be achieved in this manner.

SUMMARY OF THE INVENTION

The object of the present invention is, when filtering liquids over a long period of operation, to effectively separate dispersively contained droplets of water with simple, constructive measures.

The water separating screen according to the present invention can be used in filter elements in liquid filters, preferably in fuel filters, for example, in diesel fuel filters. An application for, for example, filtering hydraulic oil is, however, also possible.

In a filter housing, the liquid filter has an annular filter element, which particularly serves as a particle filter and which is radially through-flown from the outside to the inside by the fluid to be cleaned. The interior of the hollow cylindrical filter element forms the clean space via which the cleaned fluid is axially discharged. A center pipe may be inserted into the clean space, adding stability to the filter medium of the filter element which, for example, is embodied in a pleated manner.

A water separating screen according to the present invention, which is formed separately from the filter element and is connected to the filter element or a component situated at the filter element, may be inserted into the filter element of the liquid filter. The droplets of water, which are included in the liquid to be cleaned, thus, for example, in the fuel or the hydraulic oil, are separated at the water separating screen. The clean space in the filter element may be axially flow-connected at one end to a water collecting space which is situated in the filter housing and into which the separated water from the water separating screen is discharged. In contrast, the cleaned fluid is advantageously discharged from the clean space of the filter element via a liquid outflow line axially situated at the other end. This, for example, enables to situate the liquid filter having the water collecting space in the bottom area of the filter housing, whereas the cleaned fluid is discharged axially upwards from the clean space. The water received into the water collecting space may, for example, be discharged from the filter housing via a valve. Thus, the outflow of separated droplets of water from the water separating screen into the water collecting space is carried out in the direction of the weight force of the droplets of water.

The water separating screen includes a screen fabric having opposing axial end faces and a fabric carrier having a carrier ring at each axial end face of the screen fabric at which the opposing axial end faces of the screen fabric is held and which lends the screen fabric a defined form, for example, a cylindrical form or a conical form. The water separating screen is located at the clean side of the filter element; it is inserted into the cylindrical clean space of the filter element. If a center pipe is situated at the interior wall of the clean space at the filter medium of the filter element, the center pipe engages around the water separating screen. In particular, a gap, for example, of at least 5 mm, is provided between the water separating screen and the center pipe.

The fabric carrier extends between the axial end faces of the screen fabric and, in this area, has exclusively longitudinal struts which at least substantially extend in the direction of the longitudinal axis of the filter element or of the water separating screen situated coaxially to the filter element. The screen fabric is arranged at and surrounds a radially outer side of the longitudinal struts of the water separating screen. The screen fabric is held and connected only to the carrier rings. In contrast to the carrier rings, the screen fabric is arranged at and may be supported on a radially outer side of the longitudinal struts of the water separating screen but is not held onto or fixedly connected onto the longitudinal struts.

Owing to the at least substantially axial alignment of the longitudinal struts in the direction of the longitudinal axis, the angle of the longitudinal struts to the longitudinal axis is smaller than 45°. It may be expedient to align the longitudinal struts exactly in the direction of the longitudinal axis or at an only small angle of, for example, a maximum of 10° or 20°.

Only the longitudinal struts, but no cross struts, run in the area between the end faces of the screen fabric. Owing to the abstaining from cross struts, the structure of the fabric carrier has a high radial elasticity and may, in particular, be compressed radially inward. This enables the screen fabric, which is carried by the fabric carrier and located in particular at the outside of the longitudinal struts of the water separating screen, to give way also in the radially inward direction when the pressure radially abutting at the outside of the water separating screen is correspondingly high. Such an elevated pressure is, for example, present when using the liquid filter for filtering diesel at low temperatures and for separating out paraffins from the diesel fuel, as a result of which the screen fabric has a force radially applied from the outside to the inside. The radially elastic yielding of the longitudinal struts and of the screen fabric may prevent a tearing of the screen fabric.

Once the outer pressure diminishes, the water separating screen resumes its original position in that its radially elastic longitudinal struts return into their original position. The screen fabric, which preferably is situated on the outside of the longitudinal struts, also returns into its original position.

If the screen fabric is situated on the inside of the longitudinal struts, it may be expedient to at least spot-connect the screen fabric with the longitudinal struts.

However, when the screen fabric is situated outside of the longitudinal struts, the screen fabric is not fixedly connected with the longitudinal struts, although at times the screen fabric may rest against the longitudinal structs for support. As the screen fabric is not fixedly connected with the longitudinal struts such that the longitudinal struts can move independently of the screen fabric and the screen fabric is free slide across the longitudinal struts when the longitudinal struts deflect inwardly or give way due to fluid pressure, thereby reducing the risk of damaging the screen fabric by creating rips or tears in the screen fabric.

Advantageously, the fabric carrier is made out of plastic. Furthermore, it is expedient that the fabric carrier has a carrier ring or collar at each end face of the water separating screen and that the longitudinal struts run between the carrier rings and are connected with said carrier rings. It is particularly possible to integrally form the end face carrier rings and the in-between lying longitudinal struts. The end face carrier rings are each connected to the screen fabric. The water separating screen is, for example, to be connected via one of the carrier rings with one of the end plates situated at an end face of the filter element.

It may be expedient to keep the number of longitudinal struts relatively small to ensure a sufficient radial elasticity of the fabric carrier and, moreover, to keep the area, which is covered by the longitudinal struts and, thus, is not available for the liquid to be cleaned to pass through, as small as possible. For example, it suffices to provide four longitudinal struts uniformly distributed over the circumference in the fabric carrier.

According to a further expedient embodiment, a coalescing element expediently integrated in the filter element is, in addition to the filter element, situated in the liquid filter. The fluid to be cleaned is a dispersive mixture of two liquids, for example, fuel having dispersively embedded water, which are to be separated from each other. With the aid of the coalescing element, fine droplets of water may be joined to larger droplets, however, without causing a separation. Thus, only larger droplets of water are generated in the coalescing element, which, after through-flowing the coalescing element, are separated at the water separating screen located in the clean space. Preferably, the coalescing element is situated on the clean side of the filter element, particularly between the radial interior side of the filter medium of the filter element and the center pipe.

It may be expedient to provide a sealing element between the water separating screen and the component at the filter element, at which the water separating screen is held. Insofar as the water separating screen is connected to the end plate, the sealing element may be situated between a collar or carrier ring and the end plate. The collar or carrier ring is preferably located at the end face of the water separating screen. The sealing element between the water separating screen and the component of the filter element is either integrally formed with the collar or the carrier ring, for example, as a sealing lip molded onto the collar or the carrier ring, or separately formed as a sealing element in the form of a sealing ring.

BRIEF DESCRIPTION OF THE DRAWINGS

Further advantages and expedient embodiments may be concluded from the further claims, the description of the figures and the drawings.

In the figures, same components are provided with the same reference characters.

DESCRIPTION OF THE INVENTION

Figure 1:
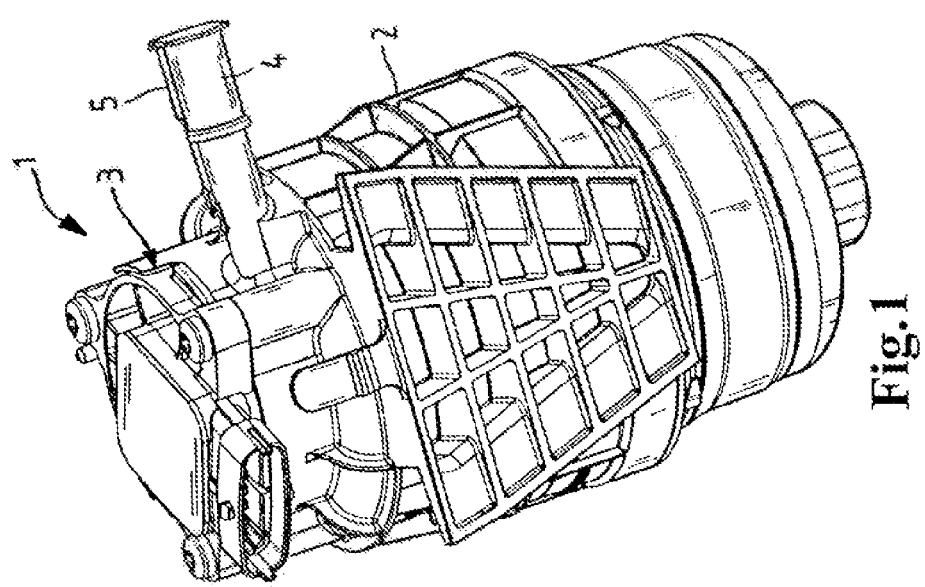
FIG. 1 shows a perspective view of a liquid filter for filtering fuel.

FIG. 1 perspectively shows a fluid filter 1 for filtering fuel, preferably diesel fuel. In a filter housing 2, liquid filter 1 has a filter element for filtering the fuel. In the upper end face region of filter housing 2, a heating device 3 is located, in which the supplied fuel is preheated before it is fed into the filter element in filter housing 2. A radial inflow line 4 for supplying the unfiltered fuel and a radial outflow line 5 for discharging the filtered fuel is also located in the upper region of filter housing 2.

Figure 2:
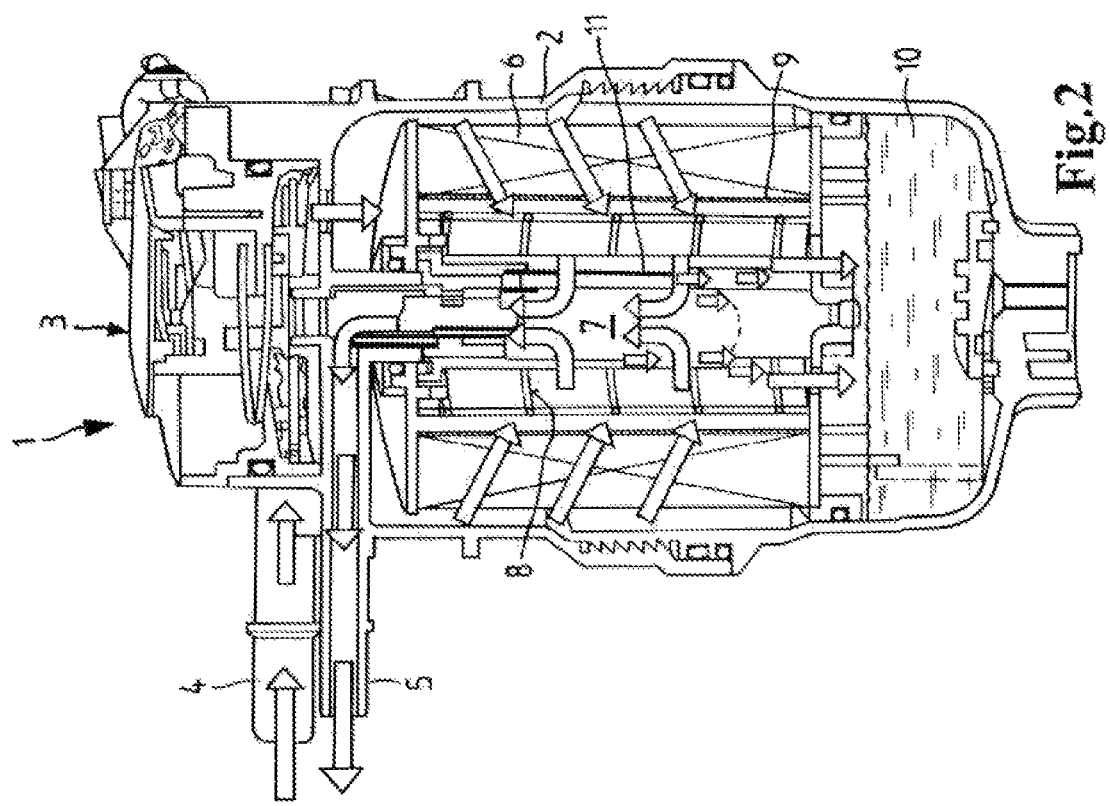
FIG. 2 shows a longitudinal section through the liquid filter having marked flow arrows to indicate the flow path.

FIG. 2 shows liquid filter 1 in a longitudinal section. Filter housing 2 accommodates annular filter element 6, which is through-flown radially from the outside to the inside by the fluid to be filtered. Accordingly, the cylindrical interior in filter element 6 forms clean space 7 from which the cleaned fluid is axially discharged.

A center or support pipe 8, which preferably is made out of plastic and braces the filter medium of filter element 6 and which provides stability to said filter medium, is inserted into clean space 7 of filter element 6. Central pipe 8 lines clean space 7.

A coalescing element 9 delimited radially inwards by center pipe 8 is located on the radially interior side of the filter medium of filter element 6. A coalescence or agglomeration of finely distributed droplets of water in the fuel occurs in coalescing element 9 so that said droplets accumulate into larger droplets.

A water collecting space 10, in which water separated when filtering the fluid is collected, is located in the bottom region near the ground in filter housing 2. The collected water can be discharged from water collecting space 10 in the filter housing via a bottom sided opening and a valve.

A water separating screen 11, embodied as a hollow cylinder and having an outer diameter which is smaller than the interior diameter of center pipe 8, is inserted into clean space 7 so that an intermediate annular space is formed. Water separating screen 11 extends axially like center pipe 8 over the complete length of clean space 7 or of filter element 6. It is, however, also possible that water separating screen 11 only extends over a part of the length of clean space 7 or filter element 6. The droplets of carried along in the fuel are separated at the outer surface shell of water separating screen 11. As indicated by the vertical downward pointing arrow, the separated droplets of water are discharged via the bottom axial end face of clean space 7 into water collecting space 10.

Figure 6:
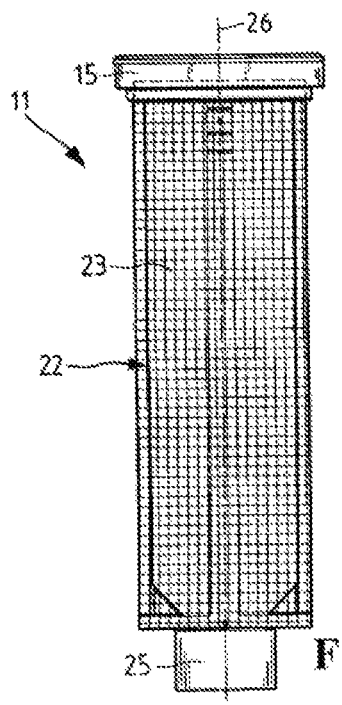
FIG. 6 shows a water separating screen with the screen fabric arranged outside of the longitudinal struts, presented in a side view.
Figure 8:
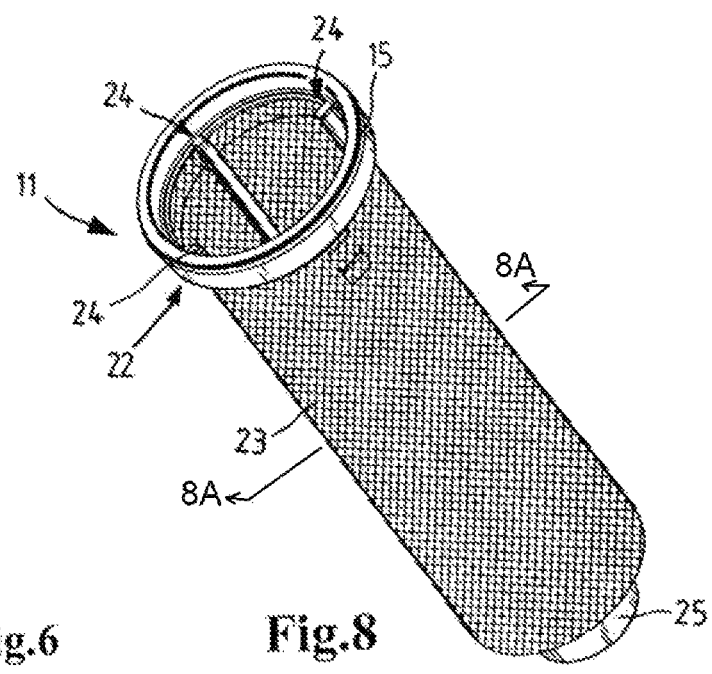
FIG. 8 shows a water separating screen with the screen fabric arranged radially outside of the longitudinal struts, as in FIG. 6, presented in a perspective view.
Figure 7:
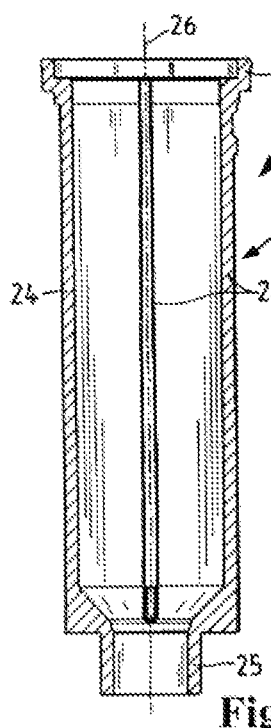
FIG. 7 shows a fabric carrier of a water separating screen in which the screen fabric may be arranged on an inner side of the longitudinal struts, presented in a longitudinal section.
Figure 8A:
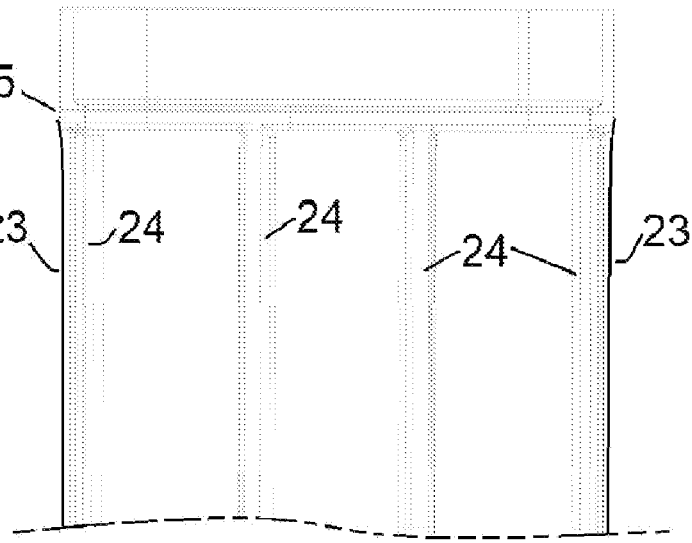
FIG. 8A shows an upper portion of the water separating screen of FIG. 8, in section vertical section along the longitudinal axis, as taken at section lines 8A, 8A of FIG. 8.

The wall of water separating screen 11 has a plurality of passage openings, via which the cleaned fuel may throughflow radially inwards from the annular space between center pipe 8 and water separating screen 11 into the interior of water separating screen 11. In particular, a screen fabric 23 (FIGS. 6 through 8) of water separating screen 11 has a mesh having a defined mesh width of, for example, 10 to 30 μm. Subsequently, the cleaned fuel liberated from the water droplets is axially discharged via the end face of clean space 7 lying axially on the top, which is flow-connected to outflow line 5.

Figure 3:
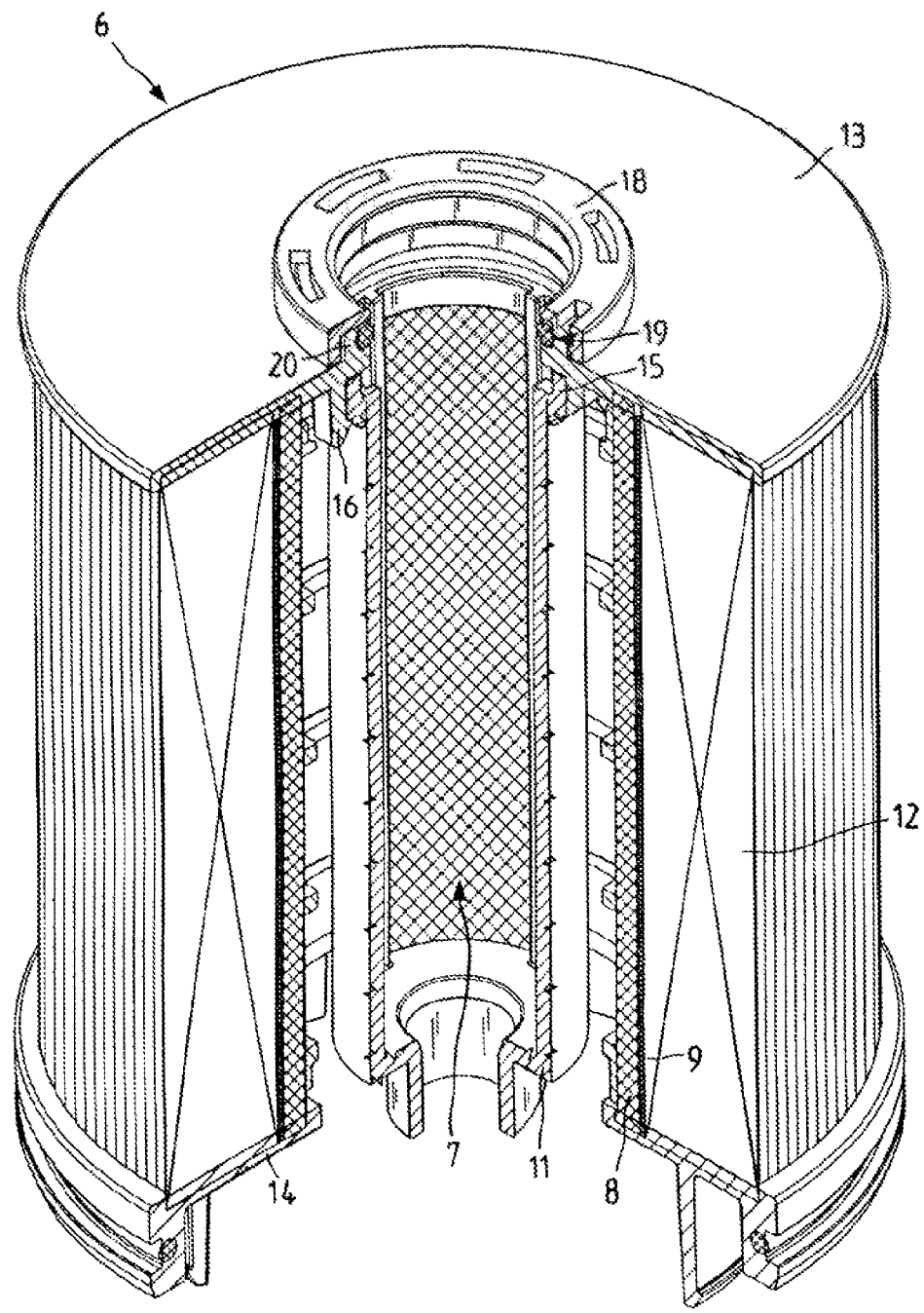
FIG. 3 shows a perspective, partially sectional view of a filter element, which is part of the liquid filter, having a water separating screen situated in the inside lying clean space.
Figure 4:
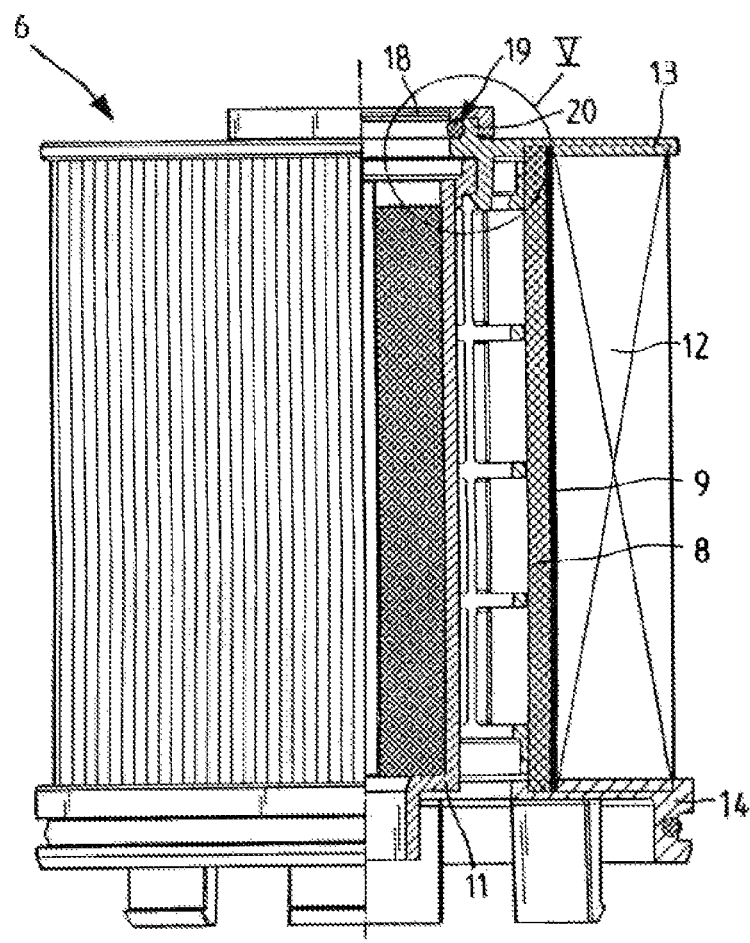
FIG. 4 shows a further, partially sectional illustration of the filter element.

FIG. 3 shows filter element 6 in a perspective and partially sectional view. Filter medium 12 of filter element 6 is embodied as a pleated filter and is enclosed on both end faces by respectively one end plate 13, 14. In the area of upper end plate 6, via the central opening of which the cleaned fluid is discharged from clean space 7, water separating screen 11 has a radially widened collar or carrier ring 15, which is connected in a latch-closing manner via snap or latch hooks 16 to end plate 13. Latch hooks 16 are molded at the inward facing side at end plate 13 or integrally formed with end plate 13 (see also FIGS. 4, 5). In the connected state, latch hooks 16 engage behind a circumferential, radially outer ring shoulder at collar or carrier ring 15.

Figure 5:
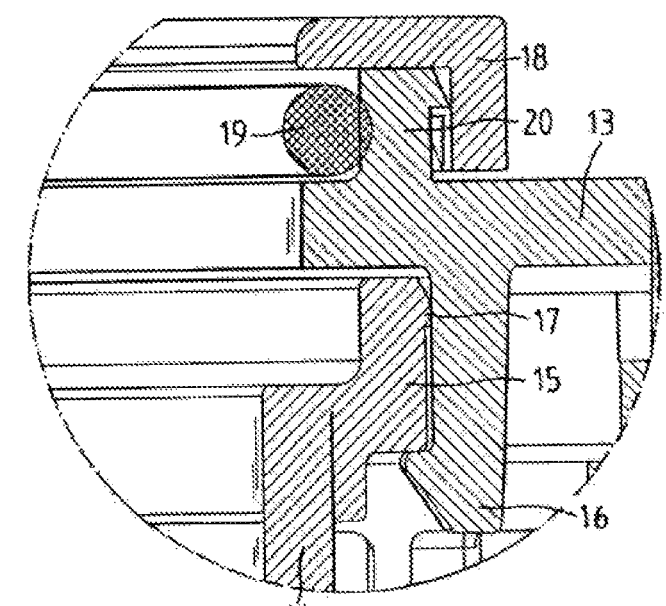
FIG. 5 shows an enlarged view of Part V from FIG. 4.

As may particularly be concluded from FIG. 5, a sealing lip 17, which abuts at the radially interior side of latch hooks 16, is molded adjacent to the free end face and, in the radially outside area, to collar or carrier ring 15. Latch hooks 16 may optionally also be configured as a continuous circumferential latch ring at the bottom side of end plate 13. A flow-proof seal between the radially outer clean side having water containing fuel and the radially interior clean side having fuel not containing water is provided via sealing lip 17.

End plate 13 has on its axially outward facing end face an axially protruding support collar 20, onto which a cover 18 is fitted. On the radially inner side of support collar 20, a sealing ring 19 is located, which, as may be concluded from FIG. 3, is braced radially inwards at a section of end plate 13.

As may further be concluded from FIG. 5, the free end face of collar 15 is located in the assembled state directly below end plate 13. During assembly, water separating screen 11 has to be inserted axially from the opposite side into clean space 7 or center pipe 8.

FIGS. 6 through 8 and 8A show the water separating screen 11 in isolation. Water separating screen 11 includes a fabric carrier 22 made out of plastic and a screen fabric 23 which is arranged radially outwardly surrounding the longitudinal struts 24, and not connected to the longitudinal structs 24, such the longitudinal struts 24 can move independently of the screen fabric 23 and the screen fabric 23 is free slide across the longitudinal struts 24 when the longitudinal struts deflect inwardly or give way due to fluid pressure. The screen fabric 23 is carried by fabric carrier 22. Fabric carrier 22 has two end face collars or carrier rings 15, 25 and the longitudinal struts 24, which run between carrier rings 15, 25 and which extend in the direction of longitudinal axis 26. Longitudinal struts 24 are integrally formed with end face carrier rings 15, 25. Longitudinal axis 26 of cylindrically embodied water separating screen 11 coincides in the assembled state with the longitudinal axis of the liquid filter.

Fabric screen 23 is arranged at a radially outer outside of longitudinal struts 24 and is connected at the end faces to each carrier ring 15, 25. In the area between carrier rings 15, 25, fabric carrier 22 exclusively has longitudinal struts 24, but no connecting cross struts, so that a radial elasticity is provided and longitudinal struts 24, which preferably are made out of plastic, may give way inwards from radially outside if the pressure applied at the outside is correspondingly high. This also makes it possible that screen fabric 23 deforms radially inward when pressure is applied. In this way, the risk of the screen fabric tearing is significantly reduced. Advantageously, the screen fabric 23 is free slide across the longitudinal struts 24 when the longitudinal struts 24 deflect, thereby reducing the chance of damage or tears in the screen fabric 23 when the longitudinal struts 24 deflect inwardly or give way due to fluid pressure. AS shown schematically in FIG. 8A, the screen fabric 23 is arranged at a radial outer side of the longitudinal struts 24, is supportable by but not fixedly connected to the longitudinal struts 24. At time the screen fabric 23 may be spaced away from the longitudinal struts 24 as shown schematically in FIG. 8A.

Distributed over the circumference, four longitudinal struts 24 in total, which respectively run exactly in the direction of longitudinal axis 26 and which are situated in a uniformly distributed manner over the circumference, are provided in fabric carrier 23. Longitudinal struts 24 only have a relatively small thickness to ensure, on the one hand, the desired radial elasticity and, on the other hand, to restrict the through-flow area at the screen fabric available for through-flowing the fluid to be cleaned as little as possible.

After the radially outside pressure has lapsed, longitudinal struts 24 may, owing to their own elasticity, return into the original position, in which longitudinal struts 24 run in a straight line. Along with the return to the original position, the screen fabric 23 also is returned into its original position.

What is claimed is:

1. A water separating screen for a filter element in a liquid filter, the water separating screen comprising:
    a fabric carrier comprised of longitudinal struts arranged circumferentially spaced apart about a longitudinal axis defining a longitudinal direction;
    wherein the fabric carrier has:
        a first carrier ring arranged at and connected to a first axial end of the longitudinal struts; and
        a second carrier ring arranged at and connected to an opposite second axial end of the longitudinal struts;
        wherein the first carrier ring and the second carrier ring are each arranged at respective axial end faces of the water separating screen;
        wherein the longitudinal struts, the first carrier ring and the second carrier ring are integrally formed together;
        wherein the longitudinal struts extend axially between the first carrier ring and the second carrier ring and are connected to the first carrier ring and the second carrier ring at the first axial end and at the opposite second axial end of the longitudinal struts, respectively;

wherein between the first carrier ring and the second carrier ring, the fabric carrier does not have cross struts connecting two or more of the longitudinal struts so that the longitudinal struts are free to deflect radially inwardly against a fluid pressure;

a screen fabric which is tubular and circumferentially surrounds the longitudinal struts of the fabric carrier, the screen fabric having:

a first axial end having a first axial end face, the first axial end face held onto the first carrier ring; and an opposite second axial end having a second axial end face, the second axial end face held onto the second carrier ring;

wherein the screen fabric is held only to the first carrier ring and the second carrier rings, the screen fabric is arranged radially outwardly surrounding and is not held onto the longitudinal struts such that the longitudinal struts are able to deflect radially inwardly relative to the screen fabric and the screen fabric is free to slide across the longitudinal struts when the longitudinal struts deflect radially inwardly due to the fluid pressure.

2. The water separating screen according to claim 1, wherein the longitudinal struts are four longitudinal struts which are circumferentially spaced apart on a circumference of the water separating screen.

3. The water separating screen according to claim 1, wherein the water separating screen is cylindrically formed.

4. The water separating screen according to claim 1, wherein, the water separating screen is conically formed.

5. An annular filter element, comprising:

a filter medium circumferentially closed about an axis of the annular filter element and extending along the axis, the axis defining an axial direction;

wherein the filter medium has a radially outer flow face and a radially inner flow face, the radially inner flow face surrounding an inner clean space of the annular filter element;

wherein the annular filter element is through-flowable radially from a radial outside to a radial inside of the annular filter element;

the water separating screen according to claim 1 disposed within the inner clean space of the annular filter element, the water separating screen formed separately from the annular filter element, the water separating screen disposed within the inner clean space of the annular filter element radially inwardly of the filler medium.

6. The annular filter element according to claim 5, wherein a tubular center pipe is disposed within the inner clean space of the annular filter element;

wherein the water separating screen is disposed within the tubular center pipe and the tubular center pipe is disposed around the water separating screen with the water separating screen disposed within the inner clean space of the annular filter element.

7. The annular filter element according to claim 5, wherein a coalescing element is disposed radially inwardly relative to the filter medium and radially outwardly of the water separating screen within the inner clean space of the annular filter element.

8. The annular filter element according to claim 5, wherein the annular filter element has an end plate arranged on an axial end face of the filter medium;

wherein the water separating screen is connected to the end plate of the annular filler element.

* * * * *